United States Patent
Geneste (10) Patent No.: US 10,450,092 B2
(45) Date of Patent: Oct. 22, 2019

(54) SPACECRAFT ARCHITECTURE HAVING TORUS-SHAPED SOLAR CONCENTRATOR

(71) Applicant: AIRBUS GROUP SAS, Blagnac (FR)

(72) Inventor: Jean-Francois Geneste, Toulouse (FR)

(73) Assignee: AIRBUS GROUP SAS, Blagnac (FR)

( * ) Notice: Subject to any disclaimer, the term of this patent is extended or adjusted under 35 U.S.C. 154(b) by 637 days.

(21) Appl. No.: 15/102,980

(22) PCT Filed: Dec. 8, 2014

(86) PCT No.: PCT/FR2014/053203
§ 371 (c)(1),
(2) Date: Jun. 9, 2016

(87) PCT Pub. No.: WO2015/086970
PCT Pub. Date: Jun. 18, 2015

(65) Prior Publication Data
US 2016/0311560 A1    Oct. 27, 2016

(30) Foreign Application Priority Data

Dec. 10, 2013  (FR) ..................................... 13 62372

(51) Int. Cl.
*B64G 1/44*      (2006.01)
*B64G 1/22*      (2006.01)
(Continued)

(52) U.S. Cl.
CPC ............. *B64G 1/446* (2013.01); *B64G 1/222* (2013.01); *B64G 1/402* (2013.01); *B64G 1/423* (2013.01);
(Continued)

(58) Field of Classification Search
CPC .... B64G 1/222; B64G 2001/224; B64G 1/44; B64G 1/446; H01M 8/04201;
(Continued)

(56) References Cited

U.S. PATENT DOCUMENTS 339,885 A * 4/1886 Hill .................... F16L 59/12
138/148
2,259,902 A * 10/1941 McCain .................. F24S 23/30
126/698
(Continued)

FOREIGN PATENT DOCUMENTS

CA     2819402 C  *  8/2018  .......... G02B 5/0891
EP     0 201 727 A1    11/1986
(Continued)

OTHER PUBLICATIONS

Wikipedia, Gregorian telescope; https://en.wikipedia.org/wiki/Gregorian_telescope (Year: 2018).*
(Continued)

*Primary Examiner* — Philip J Bonzell
*Assistant Examiner* — Alexander V. Giczy
(74) *Attorney, Agent, or Firm* — Young & Thompson (57) ABSTRACT

A spacecraft includes: a body a surface of revolution connected with the body, and a heat engine positioned at the center of the surface of revolution. The surface of revolution has a substantially open hollow torus shape with a transverse cross-section of a circle and two diametrically opposite portions each having a curvature extending from the circle. A first portion of the diametrically opposite portions has an opening and forms a solar concentrator for concentrating solar radiation in the direction of the heat engine. The first portion forms a primary solar radiation reflector. A second portion of the diametrically opposite portions is coaxial with the first portion and forms a secondary solar radiation reflector. The opening is configured so that the solar radiation passes in the direction of the center of the surface of revolution after reflection at the primary and secondary reflectors.

16 Claims, 3 Drawing Sheets (51) Int. Cl.
*H02S 30/10* (2014.01)
*H02S 10/40* (2014.01)
*B64G 1/40* (2006.01)
*B64G 1/42* (2006.01)
*B64G 1/50* (2006.01)

(52) U.S. Cl.
CPC .............. *B64G 1/503* (2013.01); *H02S 10/40* (2014.12); *H02S 30/10* (2014.12); *B64G 2001/224* (2013.01); *Y02E 10/52* (2013.01)

(58) Field of Classification Search
CPC .......... H01M 8/04208; H01M 8/04216; H01Q 19/19; H01Q 19/192; H01Q 19/10; H01Q 19/102; H01Q 19/12
See application file for complete search history.

(56) References Cited

U.S. PATENT DOCUMENTS

| | | | | |
|---|---|---|---|---|
| 3,224,000 A | * | 12/1965 | Bloetscher | B64G 1/1007 156/165 |
| 3,331,721 A | * | 7/1967 | Horst | H01Q 15/08 156/250 |
| 4,353,212 A | * | 10/1982 | Adler | B64G 1/421 290/1 R |
| 4,419,532 A | * | 12/1983 | Severns | F24S 60/00 136/253 |
| 4,438,760 A | * | 3/1984 | Radebold | B01J 19/127 126/690 |
| 4,496,787 A | * | 1/1985 | Touchais | F24S 23/00 136/248 |
| 4,581,615 A | * | 4/1986 | Levy | H01Q 19/19 343/755 |
| 4,628,904 A | * | 12/1986 | Clegg | F24S 50/00 126/684 |
| 4,672,389 A | * | 6/1987 | Ulry | H01Q 15/163 343/915 |
| 4,755,819 A | | 7/1988 | Bemasconi et al. | |
| 4,947,825 A | | 8/1990 | Moriarty | |
| 5,089,055 A | * | 2/1992 | Nakamura | B64G 1/443 136/248 |
| 5,920,294 A | * | 7/1999 | Allen | H01Q 15/163 343/912 |
| 5,990,851 A | | 11/1999 | Henderson et al. | |
| 6,557,804 B1 | * | 5/2003 | Carroll | B64G 1/007 244/172.8 |
| 8,859,153 B1 | * | 10/2014 | Cady | H01M 8/0668 429/408 |
| 2004/0004184 A1 | * | 1/2004 | Schubert | B01D 59/34 250/284 |
| 2004/0046085 A1 | * | 3/2004 | Veal | B64G 1/222 244/172.6 |
| 2006/0038085 A1 | * | 2/2006 | Duden | B64G 1/002 244/173.3 |
| 2008/0023493 A1 | * | 1/2008 | Lavan | B65D 90/00 222/386.5 |
| 2010/0166988 A1 | * | 7/2010 | Defoort | B29C 65/14 428/34.1 |
| 2010/0264656 A1 | * | 10/2010 | Flood | B64G 1/44 290/52 |
| 2011/0073149 A1 | * | 3/2011 | Ladner | H01L 35/30 136/200 |
| 2013/0033775 A1 | * | 2/2013 | Shi | G02B 5/10 359/853 |
| 2013/0126668 A1 | * | 5/2013 | Chessel | B64B 1/40 244/31 |
| 2017/0019055 A1 | * | 1/2017 | Boulanger | H01L 31/046 |

FOREIGN PATENT DOCUMENTS

| | | | | |
|---|---|---|---|---|
| EP | 0 807 991 A1 | | 11/1997 | |
| FR | 2956200 | | 8/2011 | |
| GB | 2125157 A | * | 2/1984 | .............. B64G 1/446 |
| GB | 2 328 560 A | | 2/1999 | |
| MX | 2008006473 A | * | 11/2009 | |
| WO | 2004/049538 A2 | | 6/2004 | |
| WO | 2008/060737 A2 | | 5/2008 | |

OTHER PUBLICATIONS

Wikipedia, Cassegrain reflector; https://en.wikipedia.org/wiki/Cassegrain_reflector (Year: 2018).*

David Zornes, Home Toroidal Paraboloid Reflector, 2012; https://sites.google.com/site/davidzornes/; accessed Jan. 19, 2019 (Year: 2012).*

NASA, Fuel Cell Use in the Space Shuttle; https://www.nasa.gov/topics/technology/hydrogen/fc_shuttle.html; accessed Jan. 19, 2019 (Year: 2010).*

English translation of Chinese Office Action issued in Application No. 201480072568.2.

International Search Report, dated Mar. 25, 2015, from corresponding PCT application.

* cited by examiner

SPACECRAFT ARCHITECTURE HAVING TORUS-SHAPED SOLAR CONCENTRATOR

FIELD OF THE INVENTION

This invention belongs to the field of spacecraft. More particularly the invention relates to a spacecraft having a new architecture for generating electrical power.

STATE OF THE ART

In a manner which is in itself known, present day satellites are provided with a body, antennas intended for radio electric transmissions and "wings" located on either side of said body in a substantially symmetrical manner, comprising solar panels intended to provide the satellites with electrical power.

It is also known that each wing forms a deployable structure, so that the space which it occupies is a minimum when the satellite is launched and each wing adopts its working dimensions and positions once said satellite is in orbit. Thus each wing comprises a set of solar panels bearing photo voltaic cells, said solar panels being hinged together so that they can occupy either a folded launch position in which said solar panels are folded to each other in a zigzag manner, or a deployed working position in which said solar panels are at least approximately extensions of one another.

Deployment of the solar panels is generally controlled by non-reversible drive devices controlled by a processing unit located onboard the satellite.

In addition to this the wings are connected to the body of the satellite in an articulated manner so that the solar panels can be orientated in relation to the incident solar radiation and the efficiency of said solar panels can be increased through devices orientating the wings, preferably comprising a plurality of electric motors and their associated control electronics, controlled by said processing unit.

The number of solar panels required for operating an orbiting satellite, the drive devices, the high efficiency photo voltaic coatings, or again the wing orientation devices constitute a more than negligible cost of the total cost of a satellite, and can amount to up to 20% of the total cost of a replaceable satellite.

DESCRIPTION OF THE INVENTION

The object of this invention is to provide a novel architecture for spacecraft through which the financial cost of manufacturing a satellite can be significantly reduced by reducing the cost associated with the generation of electrical power and the gathering of solar energy, without any penalty in terms of mass.

For this purpose the present invention provides a spacecraft comprising:
a body,
a heat engine,
a surface of revolution, around an axis of revolution, which is of one piece with said body, and at the center of which said heat engine is positioned.

In accordance with the invention the surface of revolution comprises a first portion forming a solar radiation concentrator in the direction of said heat engine.

Said first portion has a coating suitable for forming a solar radiation reflector.

The heat engine is arranged in such a way that the input to said heat engine is located at a focal point of the first portion. The first portion rotates about the axis of revolution of the surface of revolution via a motor, according to the position of the sun in relation to the first portion so that the first portion concentrates the solar radiation in the direction of the heat engine. The input to the heat engine, or the heat engine itself as appropriate, rotates about the axis of revolution of the surface of revolution via a motor, according to the position of the sun with respect to the first portion so that the input to the heat engine, or the heat engine itself, is always positioned at the focal point of the first portion where the solar radiation is focused so that said solar radiation can be collected.

In such spacecraft, solar radiation can be collected, concentrated and directed towards an input to the heat engine through the arrangement of the first portion and the relative positioning of the heat engine and said first portion to provide the spacecraft with electrical power so that it can function.

The spacecraft is preferably a satellite.

In accordance with preferred embodiments the invention further exhibits the following characteristics, implemented separately or in each of their technically operative combinations.

In a preferred embodiment, said first portion is a portion of revolution about the axis of revolution of said surface of revolution. Thus there is no need to resort to a motor to orientate the first portion towards the sun. Through the shape of the first portion, solar radiation can advantageously be concentrated in the direction of the center of the surface of revolution towards a plurality of focal points, at the heat engine, regardless of the position of the sun. The set of these focal points substantially describes the circle about the axis of revolution of the surface of revolution and has a substantially constant radius.

The heat engine is arranged in such a way that the input to said heat engine is located at a point on the circle formed by the set of focal points. The heat engine, or one of the subsystems such as the input to the heat engine, rotates about the axis of revolution of the surface of revolution via a motor, according to the position of the sun in relation to the first portion in such a way that the input is always positioned at a focal point where solar radiation is focused to collect said solar radiation.

In one or more embodiments of the invention, the surface of revolution comprises a second portion, coaxial with the first portion, such that, in relation to each other, the first portion and the second portion 10 form a solar radiation concentrator having a focal point located at the input to the heat engine.

Said second portion has a coating suitable for forming a solar radiation reflector.

The heat engine is then arranged in such a way that the input to said heat engine is located at a focal point of the solar radiation concentrator. The solar radiation concentrator rotates about the axis of revolution of the surface of revolution via a motor, according to the position of the sun in relation to said solar radiation concentrator so that the solar radiation concentrator concentrates the solar radiation in the direction of the heat engine. The heat engine, or one of its subsystems, rotates about the axis of revolution of the surface of revolution via a motor, according to the position of the sun in relation to the first portion in such a way that the input is always positioned at said focal point of the solar radiation concentrator where the solar radiation is focused for the purpose of collecting said solar radiation.

In a one or more embodiments said first portion and the second portion are portions of revolution about the axis of revolution of said surface of revolution. Thus there is no need to resort to a motor to orientate the first portion and the second portion towards the sun. Through the shape of the first portion and the second portion, and their arrangement with respect to each other, solar radiation can be concentrated onto a plurality of focal points at the location of the heat engine, whatever the position of the sun in relation to the center of the surface of revolution. The set of these focal points substantially delimits a circle about the axis of revolution of the surface of revolution, and is of substantially constant radius.

The heat engine is arranged in such a way that the input to said heat engine is located at a point on the circle formed by the set of focal points. The heat engine, or one of its subsystems, rotates about the axis of revolution of the surface of revolution via a motor, according to the position of the sun in relation to the first portion so that the input is always positioned at a focal point where solar radiation is focused so that said solar radiation can be collected.

In preferred embodiments of the invention, the surface of revolution comprises a third portion and a fourth portion, coaxial with the first portion and the second portion, forming a link between the first portion and the second portion; the first, second, third and fourth portions form one assembly, with a hollow internal volume.

In some embodiments, the surface of revolution is an open torus.

A torus is said to be open when it is in the form of an air chamber.

In preferred embodiments of the invention, the surface of revolution is formed by a membrane.

In preferred embodiments of the invention, the membrane is made wholly or partly of a material which is transparent to ultraviolet radiation so that solar radiation can pass to the first portion and the second portion.

In preferred embodiments of the invention, the membrane is made wholly or partly of a material which degrades in ultraviolet radiation.

In preferred embodiments of the invention, the membrane is made of a uniform material covered or impregnated with a hardening material reacting to a hardening agent. Through such a material the membrane is rendered rigid throughout the service life of the spacecraft.

In preferred embodiments of the invention, the membrane is inextensible.

By inextensible, what is meant is that the membrane presents zero or almost zero deformation under the forces which said membrane must withstand during its service life.

In preferred embodiments of the invention, the membrane can be deployed once the spacecraft is in orbit.

Thus the membrane is constructed in such a way that it can be stored in a small volume onboard the spacecraft, and then be deployed once the spacecraft is in orbit.

In preferred embodiments of the invention, the membrane can be deployed by inflation.

Preferably, the membrane is inextensible and incorporates a plurality of inextensible filaments arranged so that, when said membrane is deployed by inflation, they define a first curvature for the first portion and a second curvature for the second portion.

In preferred embodiments of the invention, said spacecraft comprises a supporting mast to separate the surface of revolution from the body of the spacecraft, said supporting mast being of one piece with the body of said spacecraft at a first extremity and with the heat engine at a second opposite extremity.

In preferred embodiments of the invention, the supporting mast is a mast that can be deployed, preferably through inflation.

Thus the supporting mast is constructed in such a way that it can be stored in a small volume onboard the spacecraft, and then deployed when said spacecraft is in orbit.

In preferred embodiments of the invention, the supporting mast can be deployed by inflation.

In the preferred arrangements of embodiments of the invention, the supporting mast is a telescopic mast.

In preferred embodiments of the invention, the supporting mast comprises an envelope folded in bellows fashion when in the folded state so as to minimize the space taken up by the supporting mast onboard the spacecraft.

In preferred embodiments of the invention, the supporting mast comprises an envelope covered or coated with a hardening material which reacts with a hardening agent. Through such an envelope the supporting mast is rendered rigid throughout the service life of the spacecraft.

In some embodiments, the hardening agent is ultraviolet radiation, heat radiation, a gas for inflating the supporting mast or the membrane, or temperature.

In preferred embodiments of the invention, the input to the heat engine comprises an optical focusing system positioned at a focal point of the solar radiation concentrator to collect solar radiation regardless of the position of the spacecraft with respect to the sun, said optical focusing system rotating about an axis of rotation perpendicular to an axis of revolution of the surface of revolution.

In preferred embodiments of the invention, said spacecraft comprises a fuel cell to generate power to operate the spacecraft during eclipses, and, coaxially around the supporting mast:
a water tank, preferably in vapor form,
a hydrogen tank,
an oxygen tank.

DESCRIPTION OF THE FIGURES

The invention will now be more specifically described in the context of preferred embodiments, which are not in any way limiting, illustrated in FIGS. 1 to 4, in which.

DETAILED DESCRIPTION OF EMBODIMENTS OF THE INVENTION

The invention will now be described in the non-limiting context of a satellite 10. It relates more particularly to satellites placed in geosynchronous orbit, and in particular in a geostationary orbit, stabilized in such a way that one specific axis of the satellite remains directed towards the Earth.

The invention can also be applied to all spacecraft, such as a space probe or exploration probe.

Figure 1:
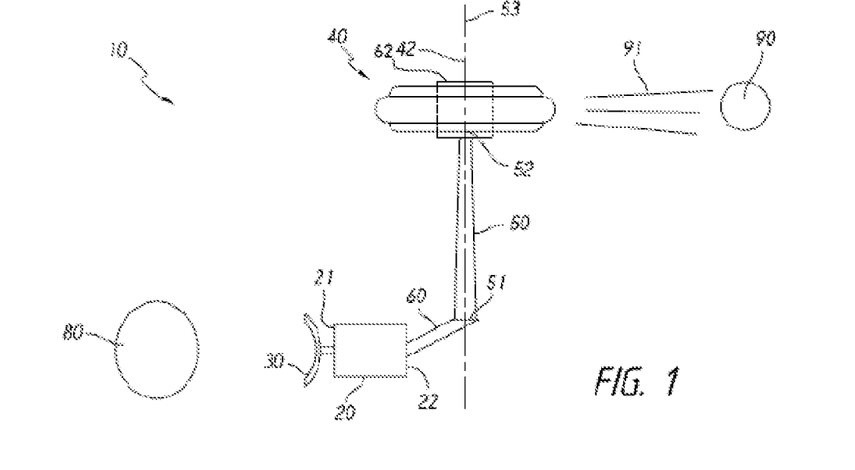
FIG. 1 illustrates a novel architecture for a satellite according to the invention in the deployed state.

FIG. 1 illustrates diagrammatically the overall architecture of satellite 10 in accordance with one embodiment, in a deployed state, when said satellite is in orbit.

Satellite 10 comprises a body 20, which is represented in a non-limiting way as a solid rectangle in FIG. 1, with a first face 21 orientated towards Earth 80 and a second face 22 opposite to said first face.

Body 20 generally comprises tanks, a payload, an equipment case and on-board electronics.

Satellite 10 comprises at least one antenna 30, of which there is only one in FIG. 1 by way of a non-limiting example, which is of one piece with body 20, preferably located at the side of first face 21, precisely orientated in the direction of a zone of Earth 80 and intended for example for radio electric transmissions.

Electrical power required for the payload of satellite 10 is provided by a surface of revolution 40 to a heat engine 62.

Surface of revolution 40 is configured and intended to concentrate solar radiation 91; this solar radiation is then transmitted to the heat engine so that in return said heat engine provides electrical power to satellite 10 for its operation.

In a preferred embodiment of the heat engine, the heat engine is a thermoacoustic machine.

In one embodiment of a thermoacoustic machine mention may be made of the electrical reaction loop thermoacoustic machine described in French patent application FR 2 956 200. Such a thermoacoustic machine has the advantage of providing good conversion efficiency, of the order of 70% of the Carnot efficiency, at a low financial cost. Such a thermoacoustic machine also has reasonable dimensions, being of the order of one meter long and 30 cm in diameter.

Surface of revolution 40 and the heat engine are placed at a distance from the body 20 of satellite 10, separated by a supporting mast 50.

Supporting mast 50 is of elongated shape, having a longitudinal axis 53, and at a first extremity 51 is of one piece with body 20.

Supporting mast 50 comprises a second extremity 52, opposite said first extremity 51, which is of one piece with surface of revolution 40 and the heat engine.

In one embodiment, supporting mast 50 is connected directly to body 20 of satellite 10.

In another embodiment, said supporting mast is linked to the body of the satellite via an auxiliary mast 60 to separate supporting mast 50 from body 20 of satellite 10.

In the example in FIG. 1, auxiliary mast 60 is attached to the second face 22 of body 20.

Figure 3A:
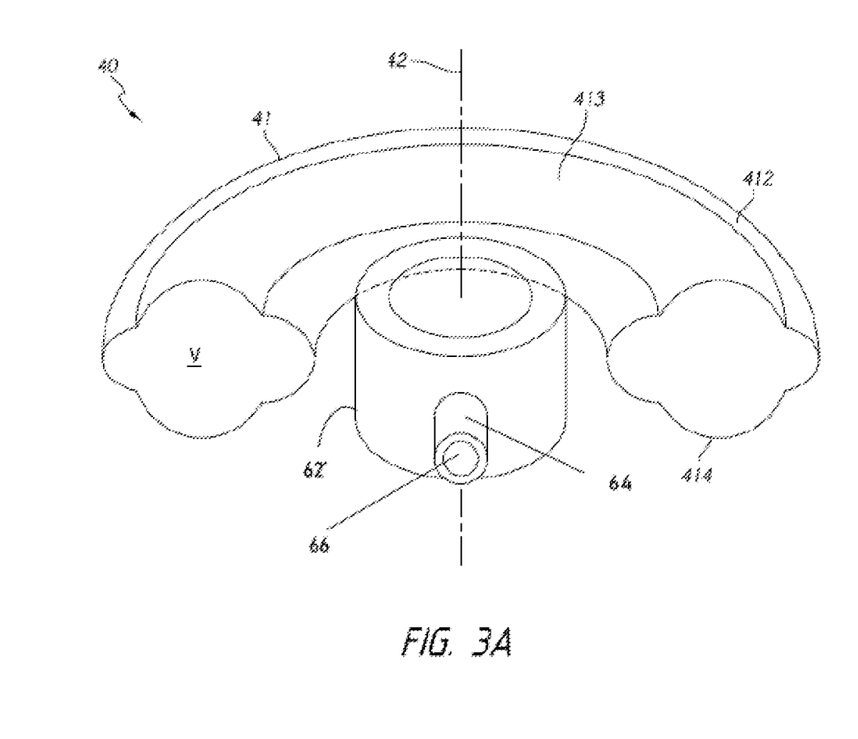
FIGS. 3A and 3B illustrate a half-membrane, cut along a plane passing through an axis of revolution of the membrane, with FIG. 3A illustrating the half-membrane including an embodiment of the heat engine and FIG. 3B illustrating the half-membrane without the heat engine.
Figure 3B:
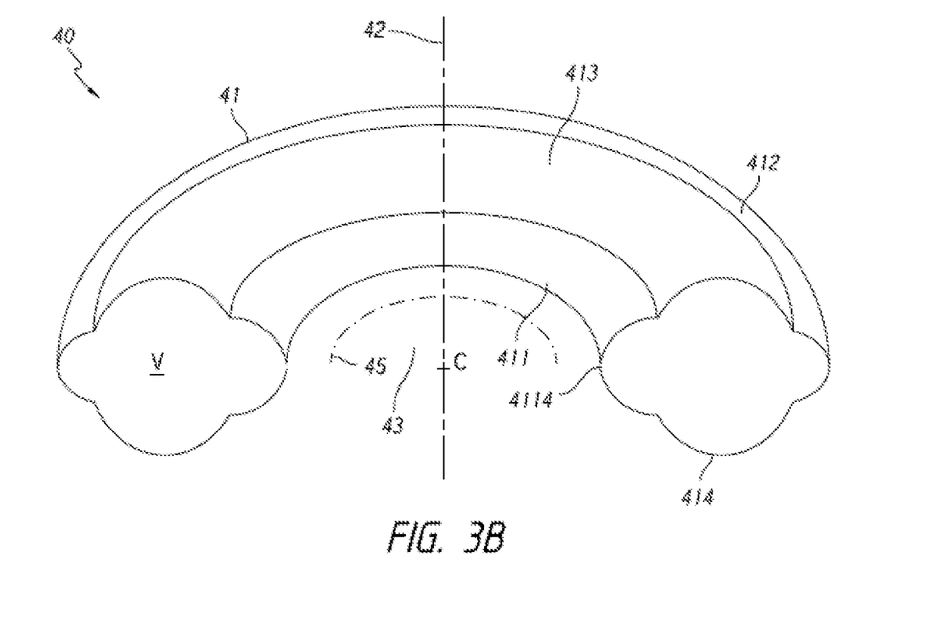

Surface of revolution 40 is in the shape of an open hollow torus, of axis of revolution 42 and center C, as partly illustrated in FIGS. 3A and 3B. Surface of revolution 40 is formed by a membrane 41.

Membrane 41 has a hollow internal volume V.

The membrane delimits a space 43 within which center C is located.

Preferably, axis of revolution 42 of membrane 41 passing through center C coincides with longitudinal axis 53 of supporting mast 50.

Figure 2:
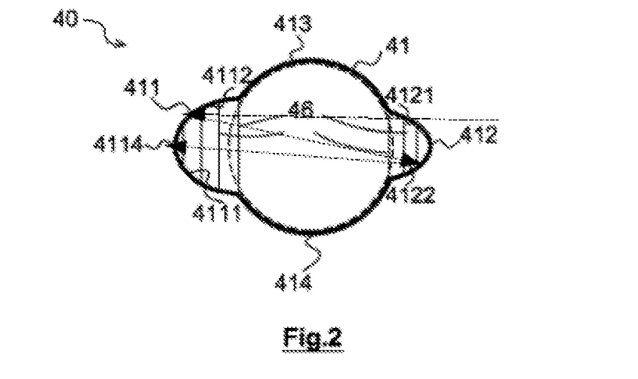
FIG. 2 illustrates a transverse cross section of the torus along a generatrix of said torus in accordance with one embodiment of the invention.

Generally, a conventional torus has a uniform circular transverse cross section, as illustrated by a dashed line in FIG. 2, in a plane passing through an axis of revolution of the torus, that is to say at one generatrix of the torus.

In accordance with the invention, the torus, and consequently membrane 41, has a transverse cross section in the form of a circle 41 deformed in two diametrically opposite zones as illustrated in FIG. 2.

FIGS. 3A and 3B illustrate a half-membrane, cut along a plane passing through axis of revolution 42, with the FIG. 3A including an embodiment of the heat engine 62' and FIG. 3B without the heat engine.

As illustrated in FIGS. 3A and 3B, membrane 41 has:
a first portion 411 having a first curvature,
a second portion 412 having a second curvature which is different from the first curvature,
first portion 411 and second portion 412 are connected together on either side by a third portion 413 and a fourth portion 414, which have a constant curvature that is essentially the same for all of them.

The first 411, second 412, third 413 and fourth 414 portions are each a portion of revolution about axis of revolution 42.

First portion 411 and second portion 412 have a convex curvature.

By convex curvature, what is meant is a curvature orientated towards an exterior of internal volume V of the membrane.

The first 411, second 412, third 413 and fourth 414 portions are coaxial, having axis of revolution 42 as their axis.

First portion 411 and second portion 412 are arranged in such a way that they provide a solar radiation concentrator.

In one embodiment, the first curvature is a parabolic curvature and the second curvature is a hyperbolic curvature.

Membrane 41 comprises a coating 4112 on an internal surface 4111 of first portion 411 and a coating 4122 on an internal surface 4121 of second portion 412.

Coating 4112 of first portion 411 is suitable for forming a solar radiation reflector, known as a primary reflector.

Coating 4122 of second portion 412 is suitable for forming a solar radiation reflector known as a secondary reflector.

Thus, as illustrated in FIGS. 3A and 3B, first portion 411 is located on the side of center C of membrane 41 and second portion 412 is located on the side opposite center C of membrane 41.

The primary reflector comprises a longitudinal opening 4114 along a plane substantially perpendicular to the axis of revolution of the membrane. Preferably said longitudinal opening is along a median plane perpendicular to axis of revolution 42 of membrane 41.

Said opening 4114 is dimensioned so that solar radiation 91 can pass in the direction of space 43 bounded by membrane 41 after reflection, which may or may not be multiple, at the primary and secondary reflectors.

It has been found that, with such a geometric shape of membrane 41, it is no longer necessary to resort to a motor to orientate said membrane towards the sun, as is the case with conventional solar panels. The toric form of membrane 41 advantageously makes it possible to concentrate solar radiation 91 regardless of the relative position of sun 90 in relation to satellite 10, in the direction of space 43 bounded by membrane 41 towards a plurality of points, known as focal points, as long as one trajectory of satellite 10 remains planar and satellite 10 maintains a constant attitude. The set of these focal points substantially forms a circle 45 around axis of revolution 42 of membrane 41, preferably center C, of substantially constant radius. A half-circle is shown as a dashed line in FIG. 3B by way of illustration.

As solar radiation 91 is focused towards space 43 bounded by membrane 41, the heat engine is positioned in such a way that it collects all the solar radiation, regardless of the position of sun 90 in relation to membrane 41.

The heat engine is located at the second extremity 52 of the mast, in an extension of supporting mast 50.

In one embodiment, the heat engine is positioned in relation to membrane 41 in such a way that one input to the heat engine is located at one point of circle 45 defining the set of focal points. A motor, preferably an electric motor, causes the heat engine or its input to pivot about longitudinal axis 53 of supporting mast 50 according to the position of the sun in relation to membrane 41 in such a way that the input to the heat engine is always positioned at a focal point where solar radiation 91 arrives, for the purpose of collecting said concentrated solar radiation.

In another embodiment, the heat engine 62' comprises a hollow tube having as its axis longitudinal axis 53 of supporting mast 50. The hollow tube comprises a branch 64, preferably substantially perpendicular to said tube, comprising an optical focusing system 66 at one extremity opposite to the tube. The heat engine 62' is positioned in relation to membrane 41 in such a way that the optical focusing system is located at a point of circle 45 defining the focal points of the solar radiation concentrator.

The optical focusing system is preferably configured to collect solar radiation 91 over substantially 180° and transmit it to the input to the heat engine via a path within the branch and the hollow tube.

The optical focusing system is selected so that it withstands high temperatures, of the order of 1000° C. Said optical focusing system is further selected according to the desired optical performance, in terms for example of transparency, optical purity, durability, etc.

In one embodiment of the branch, said branch is a waveguide.

In one embodiment of a waveguide, said waveguide is an optical fiber intended to withstand high temperatures of the order of 1000° C.

In one embodiment of the optical focusing system, said optical focusing system is a lens.

In one embodiment, the lens is a sapphire lens.

A motor, preferably an electric motor, causes the optical focusing system to pivot, possibly at the same time as the heat engine, about the longitudinal axis of the supporting mast in relation to the solar illumination, in such a way that the optical focusing system is always positioned at a focal point where solar radiation 91 arrives, so that the concentrated solar radiation can be collected.

In an improved embodiment, only the branch and the optical focusing system can move in rotation about the longitudinal axis of the supporting mast. The branch and the optical focusing system are connected to the tube of the heat engine by a rotating joint which allows the branch and the optical focusing system to rotate without causing the tube and the heat engine to rotate. A motor of smaller size can then be used.

Supporting mast 50 and surface of revolution 40 are structures preferably made of an inextensible material.

Said structures are made in such a way that they can be transported and/or stored in a small volume onboard satellite 10, and then be deployed and rendered rigid in situ, that is to say once the satellite is in orbit.

The structures of supporting mast 50 and surface of revolution 40 are preferably light and flexible and have a small volume onboard satellite 10 to minimize the mass and volume of satellite 10 when it is launched.

Said structures are generally stored in a small volume, for example in a folded, rolled or collapsed state, with or without constraints.

In orbit, said structures deploy without external assistance or with appropriate means of deployment, such as for example an inflatable bladder, jack, or again an articulated mechanical device.

Preferably, so that the structures are not deployed in too brutal a manner and therefore are not damaged, said structures also comprise a braking device intended to limit the speed with which said structures are deployed during their deployment.

In one structural embodiment, at least one of the structures comprises rigid pieces articulated together, which once deployed make it possible to maintain at least one structure deployed when satellite 10 is in orbit.

In another embodiment, at least one of the structures is an inflatable structure, preferably the two structures are inflatable.

In a preferred embodiment, permanent inflation means are used to maintain at least one structure deployed during the service life of satellite 10.

In another preferred embodiment, at least one structure is covered or impregnated with a material which hardens after deployment in order to maintain the structure deployed during the service life of satellite 10.

By a material which hardens after deployment, what is meant is a material which hardens once deployment has been effected.

Use of a material hardening after deployment makes it possible to overcome any damage to the at least one structure, in terms of its being leaktight in relation to the ambient environment, which may occur during the course of the service life of satellite 10, which as a consequence makes it possible to increase the service life of the structure when in orbit. Thus there is no need to resort to a structure having leaktight performance over the long term, which is of non-negligible advantage in terms of the construction cost of satellite 10.

In one embodiment of the hardening material, the hardening material reacts with at least one hardening agent, such as for example ultraviolet radiation, thermal radiation, temperature, humidity, or again a gas onboard for inflation of the structure.

In a particular embodiment, the at least one structure incorporates a heating element, such as for example a heating filament, the heating of which controls hardening of the hardening material once the at least one structure has been deployed.

In a particular embodiment, when the at least one structure is impregnated with a hardening material, said at least one structure can be made from preimpregnated fibers, preferably those currently employed for the constitution of composite materials particularly in aviation, such as for example mineral fibers (carbon, glass, polyamide, polyester fibers etc.,) or artificial fibers (plant fibers), or a mixture of fibers of different kinds.

Because it is impregnated by a hardening material such as for example a polymerizable resin, the at least one structure remains flexible for as long as the impregnating resin is not polymerized, then hardened and rendered rigid after deployment of the at least one structure and while it is maintained deployed and taut, by polymerization of the resin initiated by exposure of the at least one structure to an appropriate agent for hardening or polymerizing the resin according to the nature of that resin.

But regardless of how a structure is constructed, it is essential that the start of hardening should be controllable, and adjusted or adjustable to the ambient conditions reigning on the site where said structure is deployed, that is to say in orbit.

In one embodiment of the supporting mast, the structure of said supporting mast is an envelope comprising nesting pieces such that on deployment the pieces extend telescopically. Preferably the structure is inflatable and wholly or partly covered or impregnated with a material which hardens after deployment.

In another embodiment of the supporting mast, the structure of said supporting mast is an envelope of the tape type, stored in a rolled manner about a dispenser, which unrolls in the course of deployment.

In one embodiment of supporting mast 50, when the envelope of said supporting mast is covered or impregnated by a material which hardens after deployment there is no need for the envelope to be leaktight during the service life of satellite 10, it is sufficient for the envelope to be leaktight during its deployment stage and until the hardening material hardens. Thus, the quantity of gas needed to inflate the envelope is less, and for a given cost the service life of satellite 10 is very appreciably lengthened.

In the embodiment of membrane 41, said membrane is made of a homogeneous material covered or impregnated with hardening material, apart from a longitudinal part which forms opening 4114. Coatings 4112 and 4122 forming the primary and secondary reflectors are made of a material reflecting solar radiation, except for a longitudinal part forming opening 4114.

In one embodiment, the primary and secondary reflectors are formed by depositing silver or aluminum vapor on the inner surface 4111 of first portion 411 and the inner surface 4121 of second portion 412.

In one embodiment, membrane 41 comprises, in the primary reflector and the secondary reflector, a protective layer (not shown) made of a material which hardens in solar radiation.

In one embodiment of the protective layer, said protective layer is made from a polymer which is transparent to solar radiation.

The two longitudinal parts are made of a material which degrades after reaction with a degrading agent in such a way that ultraviolet radiation allows solar radiation 91 to pass into the space 43 bounded by membrane 41.

The homogeneous material is made of a material which is transparent to ultraviolet radiation so that solar radiation can pass through the homogeneous material in third portion 413 and fourth portion 414 and come into contact with the primary and secondary reflectors.

In another embodiment of membrane 41, said membrane is made of a homogeneous material which is not covered or impregnated with hardening material. Only the protective layers of the primary and secondary reflectors are made of a material which hardens with a hardening agent, in addition to being transparent to solar radiation. The homogeneous material of membrane 41 is made of a material which degrades after reaction with a degrading agent such as ultraviolet radiation, until it disappears.

In this embodiment, the primary and secondary reflectors are then no longer connected to each other once the homogeneous material has degraded. In this case, the homogeneous material of some parts of the membrane forming a transverse cross section and providing a link between coating 4112 forming the primary reflector and coating 4122 forming the secondary reflector is covered or impregnated with hardening material. Said parts are not thought to degrade with UV.

Likewise, once the homogeneous material has been degraded, the coating forming the primary reflector is divided into two parts along a plane perpendicular to axis of revolution 42, at opening 4114. Membrane 41 comprises connecting beams (not shown), preferably also deployable, preferably by inflation, to connect the two parts of the primary reflector.

The connecting beams are preferably made of a hardening material.

In order that membrane 41 should adopt the non-uniformly circular toric shape in transverse cross section, said membrane comprises flexible and inextensible filaments 46 as illustrated in FIG. 2.

By flexible, what is meant is that the filament can be bent, folded or rolled so that it can be housed in the folded state with membrane 41 in the small dedicated volume of satellite 10 during launch.

By inextensible, what is meant is that the filament has zero or almost zero deformation under the forces which it has to withstand during the deployment of membrane 41.

The first curvature of first portion 411, and respectively the second curvature of second portion 412, is made using at least one filament 46.

In the folded state, filaments 46 are positioned and dimensioned in such a way that, when membrane 41 is deployed, the filaments stretch to their maximum during the course of deployment of said membrane and cause said membrane to deform until it forms part of the first curvature of first portion 411 and also the second curvature of second portion 412 once the membrane has been deployed.

In one embodiment, said filaments are made of a material which is transparent to ultraviolet radiation.

Preferably said filaments are made of a material which degrades after reaction with a degrading agent such as ultraviolet radiation, after the protective layers of the primary and second reflectors have hardened.

In one embodiment, satellite 10 comprises a radiator (not shown) associated with a heat engine.

In one embodiment, said radiator is located along supporting mast 50, close to a cold source of the engine.

In one embodiment, in order to generate energy for functioning of satellite 10 during eclipses, as a replacement for the heat engine or in combination with the heat engine, satellite 10 comprises a fuel cell, preferably a high temperature fuel cell, operating at temperatures typically of the order of 800° C.

In a first embodiment, satellite 10 comprises a low temperature cell, preferably positioned within satellite 10.

In another embodiment, satellite 10 comprises a high temperature cell preferably positioned on supporting mast 50, close to a hot source of the heat engine, for an obvious synergistic effect.

Figure 4:
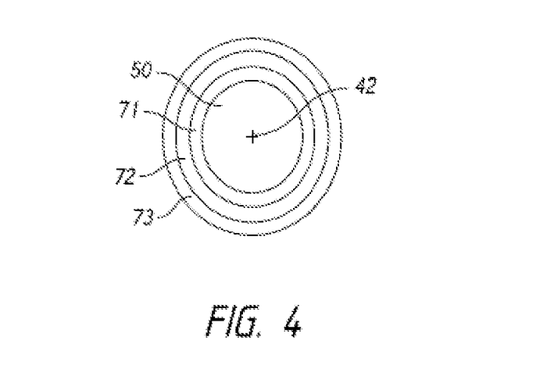
FIG. 4 illustrates one coaxial position of the tanks about the supporting mast for functioning of the satellite during eclipses.

Preferably, in the example of an $H_2/O_2$ fuel cell, satellite 10 comprises three tanks configured coaxially about supporting mast 50, starting from supporting mast 50 and extending therefrom, as illustrated in FIG. 4:

a tank 71 for water in the form of vapor,
a hydrogen tank 72,
an oxygen tank 73.

The three tanks 71, 72, 73 empty or fill alternately whether or not an eclipse is present.

Such positioning of the tanks is advantageous, mainly because:

the oxygen is separate from the hydrogen,
the hydrogen, the more volatile component, must pass through several walls before leaking out into the vacuum; a more leaktight effect is thus achieved, given their proximity to the heat engine, the three tanks 71, 72, 73 have a second function which is that of a radiator, because the heat engine needs a cold source, the radiator function of the three tanks advantageously makes it possible to conserve water in particular, including during eclipse stages, in the form of vapor at very low temperatures. For this, it is sufficient for the storage pressure to be very low, which implies large tanks, and thus a large radiating surface, hence a particularly effective radiator, the fuel cell gases within the radiator will serve as a vector for heat transfer, which will therefore take place through convection and conduction.

Preferably, the oxygen tank is positioned furthest from supporting mast 50. Such a positioning makes it possible to preserve a minimum temperature for the water in the vapor phase under very low pressure, typically 50 mbar, during the eclipse stage.

In one embodiment of the tanks, said tanks are made of a material which is leaktight with regard to their contents throughout the service life of the satellite, which is of the order of 18 years.

In one embodiment of the tanks, said tanks are made of a hardening material.

In one embodiment of the tanks, the walls are wholly or partly transparent.

In one embodiment of the tanks, the walls forming the tanks are wholly or partly reflecting.

In one embodiment of the tanks, mast 50 may itself be a part of the tank (for example the hydrogen tank).

The above description clearly illustrates that this invention achieves the set objectives through its various characteristics and their advantages. In particular, it provides a spacecraft representing a lesser financial investment in comparison with other spacecraft, while retaining electrical power generation and simplicity of implementation without penalizing the weight of the spacecraft.

The invention claimed is:

1. A spacecraft comprising:
a body;
a surface of revolution connected with the body, the surface of revolution having a substantially open hollow torus shape with a transverse cross-section of a circle deformed in two diametrically opposite portions, the surface of revolution being rotatable about a center axis of revolution, the surface of revolution delimiting a hollow space; and
a heat engine positioned at the center of the surface of revolution in the hollow space,
wherein a first portion of the diametrically opposite portions has an opening and forms a concentrator for solar radiation in the direction of said heat engine at the center of the surface of revolution, the first portion forming a primary solar radiation reflector, a second portion of the diametrically opposite portions being coaxial with the first portion and forming a secondary solar radiation reflector,
wherein the opening is configured so that the solar radiation passes in the direction of the center of the surface of revolution after reflection at the primary and secondary reflectors.

2. The spacecraft as claimed in claim 1, wherein the surface of revolution comprises a third portion and a fourth portion coaxial with the first portion and the second portion forming a link between the first portion and the second portion, the first, second, third, and fourth portions forming an assembly with a hollow internal volume.

3. The spacecraft as claimed in claim 2, wherein the surface of revolution is formed by a membrane.

4. The spacecraft as claimed in claim 3, wherein the membrane is wholly or partly made of a material which is transparent to ultraviolet radiation.

5. The spacecraft as claimed in claim 3, wherein the membrane is configured to be deployed and is wholly or partly made of a material which degrades in ultraviolet radiation after the material is deployed.

6. The spacecraft as claimed in claim 3, wherein the membrane is configured to be deployed.

7. The spacecraft as claimed in claim 6, wherein the membrane is configured to be deployed by inflation.

8. The spacecraft as claimed in claim 7, wherein the membrane comprises a plurality of filaments defining a first curvature for the first portion and a second curvature for the second portion after deployment of said membrane, the filaments presenting zero or almost zero deformation under forces exerted on the membrane after deployment of the membrane.

9. The spacecraft as claimed in claim 1, further comprising a supporting mast that is of one piece at a first extremity with the body of the spacecraft and opposite the heat engine at a second extremity.

10. The spacecraft as claimed in claim 9, wherein the supporting mast is a deployable mast.

11. The spacecraft as claimed in claim 9, wherein the supporting mast is a telescopic mast.

12. The spacecraft as claimed in claim 9, wherein the supporting mast comprises an envelope covered or impregnated with a hardening material.

13. The spacecraft as claimed in claim 9, further comprising, coaxially around the supporting mast:
a water tank;
a hydrogen tank; and
an oxygen tank.

14. The spacecraft as claimed in claim 1, wherein one input to the heat engine comprises an optical focusing system positioned at a focal point of the solar radiation concentrator, said optical focusing system being configured to rotate about an axis of rotation perpendicular to the axis of revolution of the surface of revolution.

15. The spacecraft as claimed in claim 1, wherein the first portion and the second portion each have a convex curvature toward an exterior of an internal volume of the surface of revolution.

16. The spacecraft as claimed in claim 1, wherein the first curvature of the first portion is a parabolic curvature, and the second curvature of the second portion is a hyperbolic curvature.

* * * * *